US012602653B2

(12) United States Patent　　(10) Patent No.:　US 12,602,653 B2
Gomez Conzatti y Martinez et al.　　(45) Date of Patent:　Apr. 14, 2026

(54) SAND PILE COMPLETION SYSTEM AND METHOD

(71) Applicant: Schlumberger Technology Corporation, Sugar Land, TX (US)

(72) Inventors: Herbe Gomez Conzatti y Martinez, Sugar Land, TX (US); Karishma Mohini Prasad, Sugar Land, TX (US); Chad Kraemer, Houston, TX (US); Salvador Ayala, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 232 days.

(21) Appl. No.: 18/569,696

(22) PCT Filed: Aug. 12, 2022

(86) PCT No.: PCT/US2022/074899
§ 371 (c)(1),
(2) Date: Dec. 13, 2023

(87) PCT Pub. No.: WO2023/019238
PCT Pub. Date: Feb. 16, 2023

(65) Prior Publication Data
US 2024/0265344 A1　　Aug. 8, 2024

Related U.S. Application Data

(60) Provisional application No. 63/252,828, filed on Oct. 6, 2021, provisional application No. 63/260,188, filed on Aug. 12, 2021.

(51) Int. Cl.
*G06Q 10/087*　　(2023.01)
*E21B 43/26*　　(2006.01)

(52) U.S. Cl.
CPC ....... *G06Q 10/087* (2013.01); *E21B 43/2607* (2020.05)

(58) Field of Classification Search
CPC .............. G06Q 10/087; E21B 43/2607; E21B 2200/20
(Continued)

(56) References Cited

U.S. PATENT DOCUMENTS

2013/0228331 A1　9/2013　Mothersbaugh
2013/0312951 A1　11/2013　Kellam, III
(Continued)

FOREIGN PATENT DOCUMENTS

JP　　2017220058 A　12/2017

OTHER PUBLICATIONS

"Drone-based Volume Measurement Delivers Big Time-Savings to Mining", downloaded from the internet on Mar. 31, 2025 from [: https://web.archive.org/web/20230425091535/https://medium.com/aerial-acuity/drone-based-volume-measurement-delivers-big-time-savings-to-mining-eb684e748819#.y6r8w5kb8], Mining & Quarries, 2016, 10 pages.
(Continued)

*Primary Examiner* — Russell S Glass
(74) *Attorney, Agent, or Firm* — Jeffrey D. Frantz

(57) ABSTRACT

A method for stockpiling sand and/or monitoring a sand stockpile includes obtaining one or more images associated with stockpiling sand used for a fracturing process of a hydrocarbon system and analyzing the one or more images to determine a site location for a sand stockpile and/or an amount of sand in the sand stockpile.

18 Claims, 6 Drawing Sheets

(58) Field of Classification Search
USPC .......................................................... 705/28
See application file for complete search history.

(56) References Cited

U.S. PATENT DOCUMENTS

| | | | | |
|---|---|---|---|---|
| 2017/0259227 | A1* | 9/2017 | Morris | B01F 23/551 |
| 2018/0187662 | A1* | 7/2018 | Hill | F04B 47/02 |
| 2020/0226372 | A1* | 7/2020 | Adler | G06V 10/764 |
| 2020/0406936 | A1* | 12/2020 | Entchev | E21B 43/2607 |

OTHER PUBLICATIONS

"Volume Measurement with Drones", downloaded from the internet on Mar. 14, 2025 from [https://support.dronedeploy.com/docs/volume-measurement], DroneDeploy, Updated Jan. 2025, 11 pages.
International Search Report and Written Opinion of International Patent Application No. PCT/US2022/074899 dated Nov. 29, 2022, 11 Pages.

* cited by examiner

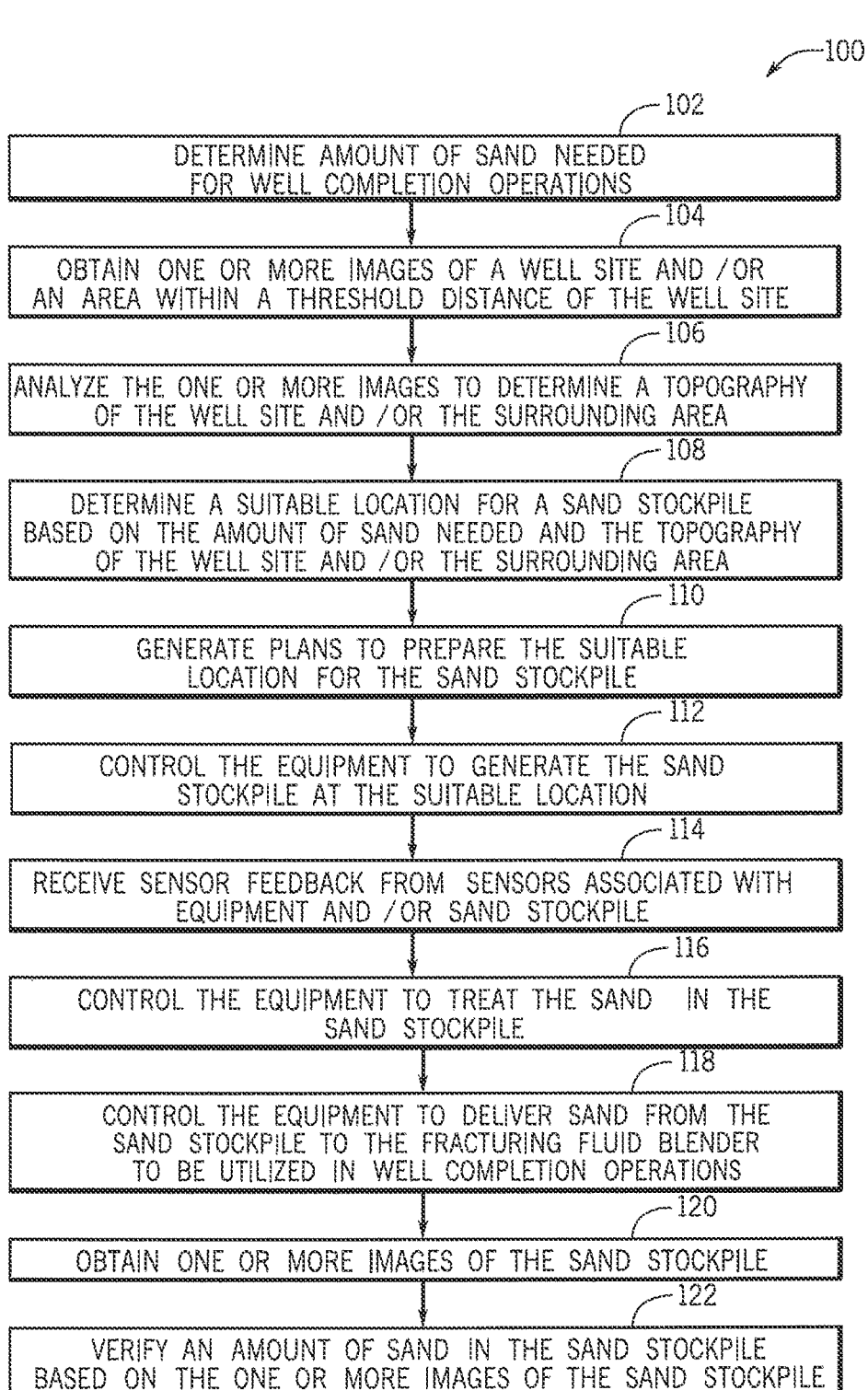

—100

102
DETERMINE AMOUNT OF SAND NEEDED
FOR WELL COMPLETION OPERATIONS

104
OBTAIN ONE OR MORE IMAGES OF A WELL SITE AND / OR
AN AREA WITHIN A THRESHOLD DISTANCE OF THE WELL SITE

106
ANALYZE THE ONE OR MORE IMAGES TO DETERMINE A TOPOGRAPHY
OF THE WELL SITE AND / OR THE SURROUNDING AREA

108
DETERMINE A SUITABLE LOCATION FOR A SAND STOCKPILE
BASED ON THE AMOUNT OF SAND NEEDED AND THE TOPOGRAPHY
OF THE WELL SITE AND / OR THE SURROUNDING AREA

110
GENERATE PLANS TO PREPARE THE SUITABLE
LOCATION FOR THE SAND STOCKPILE

112
CONTROL THE EQUIPMENT TO GENERATE THE SAND
STOCKPILE AT THE SUITABLE LOCATION

114
RECEIVE SENSOR FEEDBACK FROM SENSORS ASSOCIATED WITH
EQUIPMENT AND / OR SAND STOCKPILE

116
CONTROL THE EQUIPMENT TO TREAT THE SAND IN THE
SAND STOCKPILE

118
CONTROL THE EQUIPMENT TO DELIVER SAND FROM THE
SAND STOCKPILE TO THE FRACTURING FLUID BLENDER
TO BE UTILIZED IN WELL COMPLETION OPERATIONS

120
OBTAIN ONE OR MORE IMAGES OF THE SAND STOCKPILE

122
VERIFY AN AMOUNT OF SAND IN THE SAND STOCKPILE
BASED ON THE ONE OR MORE IMAGES OF THE SAND STOCKPILE

FIG. 5

SAND PILE COMPLETION SYSTEM AND METHOD

CROSS-REFERENCE TO RELATED APPLICATIONS

This application is a National Stage Entry of International Patent Application No. PCT/US2022/074899, filed on Aug. 12, 2022, which claims priority to and the benefit of U.S. Provisional Patent Application No. 63/260,188, entitled "Sand Pile Completion System and Method," filed on Aug. 12, 2021, and U.S. Provisional Patent Application No. 63/252,828, entitled "Sand Pile Completion System and Method," filed on Oct. 6, 2021, which are hereby incorporated by reference in their entirety for all purposes.

BACKGROUND

The present disclosure generally relates to retrieving, managing, and distributing sand for well completion operations. More particularly, the present disclosure relates to placing, measuring, managing, treating, and using sand stockpiles to produce fracturing slurry on-demand for delivery to one or more fracturing wells depending on the particular needs of the one or more fracturing wells.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In general, wells producing shale oil and/or shale gas generally go through three planning phases: drilling, completion, and production. During these phases, different chemicals and materials (e.g., water, sand) may be utilized to complete the well and/or facilitate production from the well. As the economic landscape changes, mobile mining and damp sand utilization for well completion operations are quickly being adopted due to the important economic benefits and simplified logistic requirements. Further, mobile mining and damp sand usage may also enable reduction of crystal silica dust and greenhouse gas (GHG) emissions. As such, it has been recognized that systems and methods for improved and/or increased sand utilization for well completion operations are desirable.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes obtaining one or more images associated with stockpiling sand used for a fracturing process of a hydrocarbon system and analyzing the one or more images to determine a site location for a sand stockpile and/or an amount of sand in the sand stockpile.

Certain embodiments of the present disclosure also include a method that includes supplying sand to a fracturing site to produce a sand stockpile, generating a fracturing slurry using at least sand from the sand stockpile and water, and conveying the fracturing slurry to the fracturing site via one or more pipelines.

Certain embodiments of the present disclosure also include a system that includes at least one image capturing device configured to obtain one or more images associated with stockpiling sand used for a fracturing process of a hydrocarbon system and a processor configured to analyze the one or more images to determine a site location for a sand stockpile and/or an amount of sand in the sand stockpile.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 5 illustrates an embodiment of a flow diagram of a method for locating a site for a sand stockpile and managing a sand stockpile for well completion operations, in accordance with an aspect of the present disclosure.

DETAILED DESCRIPTION

Figure 1:
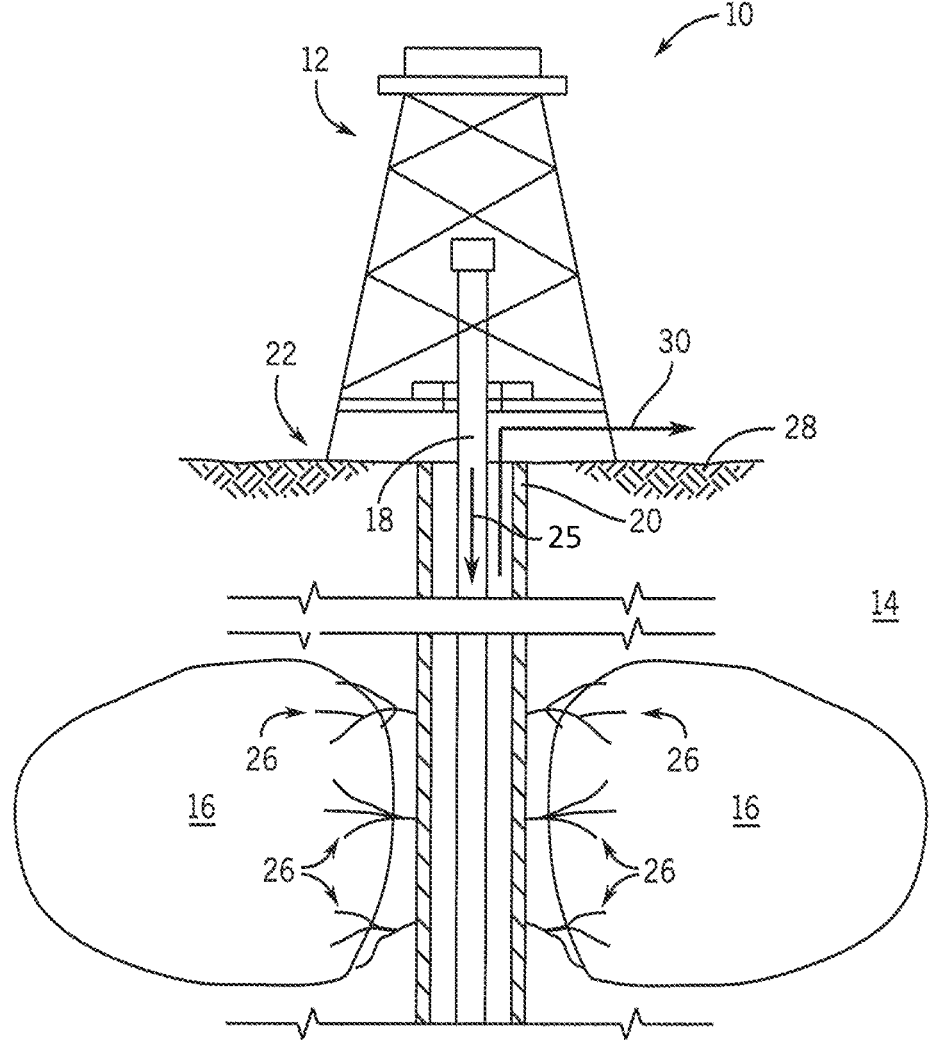
FIG. 1 illustrates an embodiment of a well-site having a drilling rig positioned above a subterranean formation that includes one or more oil and/or gas reservoirs, in accordance with the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

As used herein, a fracture shall be understood as one or more cracks or surfaces of breakage within rock. Fractures can enhance permeability of rocks greatly by connecting pores together and, for that reason, fractures can be induced mechanically in some reservoirs in order to boost hydrocarbon flow. Certain fractures may also be referred to as natural fractures to distinguish them from fractures induced as part of a reservoir stimulation. Fractures can also be grouped into fracture clusters (or "perf clusters") where the fractures of a given fracture cluster (perf cluster) connect to the wellbore through a single perforated zone. As used herein, the term "fracturing" refers to the process and methods of breaking down a geological formation and creating a fracture (i.e., the rock formation around a wellbore) by pumping fluid at relatively high pressures (e.g., pressure above the determined closure pressure of the formation) in order to increase production rates from a hydrocarbon reservoir.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed or are caused to be performed, for example, by a process control system (i.e., solely by the process control system, without human intervention). In addition, as used herein, the term "stockpiling" and "sand stockpile" may refer to an amount of sand that is exposed to the environment and is not contained in any type of storage equipment.

Mobile mining and sand (e.g., dry sand, damp sand) utilization for well completion operations enable reduction of crystal silica dust and greenhouse gas (GHG) emissions associated with well completion operations. However, successful completion of oil and gas wells typically requires placement of specific volumes of sand/proppant into a subterranean formation to maintain a size of the fractures (e.g., to keep the fractures open), and insufficient volumes of sand may limit an ability of service companies to complete wells as designed. In traditional systems employing sand for well completion operations, the sand may be delivered from off-site locations via vehicles (e.g., trucks), and in some cases, the sand may be contained within a container to reduce an amount of sand lost while transporting the sand to a well-site location. Further, upon arriving at the well-site location, the vehicles utilized to transport the sand may deposit the sand into a silo or other containment device for storage, such that the sand may be retrieved and used as needed. However, oftentimes in traditional systems, sand storage facilities are inadequate and an insufficient amount of sand is present at the well-site location to perform well completion operations, thereby reducing an efficiency of the well completion process. For example, during well completion operations, operators may experience downtime while waiting on vehicles to deliver sand, thereby increasing time and costs associated with completing a well. Additionally, containment devices utilized to store the sand may be costly and further may increase a footprint of the well-site location, thereby limiting an amount of area that can be used to perform well operations and/or interfering with the various systems employed in the well completion operations. Indeed, traditional systems and methods employing sand for well completion operations are associated with significant costs for retrieving and delivering sand from off-site locations and storing the sand for well completion operations. Accordingly, it is now recognized that improved systems and methods for retrieving and stockpiling sand and managing a sand stockpile at or near a well-site location are desired.

With this in mind, the advent of systems and methods that may determine an appropriate location to stockpile an amount of sand and manage a sand stockpile at or near a well-site location has made well completion operations more feasible. That is, because well-site locations (e.g., fracturing sites) may have limited size capacities, it may be particularly advantageous to stockpile sand at or near a well-site location and manage the sand stockpile such that a sufficient amount of sand is available on demand for well-completion operations. Additionally, the present embodiments discussed herein may minimize and/or eliminate the need for sand storage equipment, thereby decreasing costs associated with storing sand and increasing an amount of area for other well completion operations (e.g., as a result of the space saved from eliminating sand storage equipment). Further still, the present embodiments discussed herein may reduce reliance on vehicle deliveries to acquire sand for down-well completion operations, thereby reducing emissions and increasing the economic benefits of the well completion operations.

FIG. 1 illustrates a well-site 10 having a drilling rig 12 positioned above a subterranean formation 14 that includes one or more oil and/or gas reservoirs 16. During operation, a derrick and a hoisting apparatus of the drilling rig 12 may raise and lower a drilling string 18 into and out of a wellbore 20 of a well 22 to drill the wellbore 20 into the subterranean formation 14, as well as to position downhole well tools within the wellbore 20 to facilitate completion and production operations of the well 22. For example, in certain operations, a hydraulic fracturing fluid (e.g., a fracturing slurry, mixture of sand, water, and/or one or more chemicals) may be introduced into the well 22 through the drilling string 18, as illustrated by arrow 25, which may be used to create fractures 26 in the subterranean formation 14 to facilitate production of oil and/or gas resources from the well 22. As described in greater detail herein, the fracturing slurry introduced into the well 22 may include sand retrieved from a stockpile of sand at or near the well-site 10.

Figure 2:
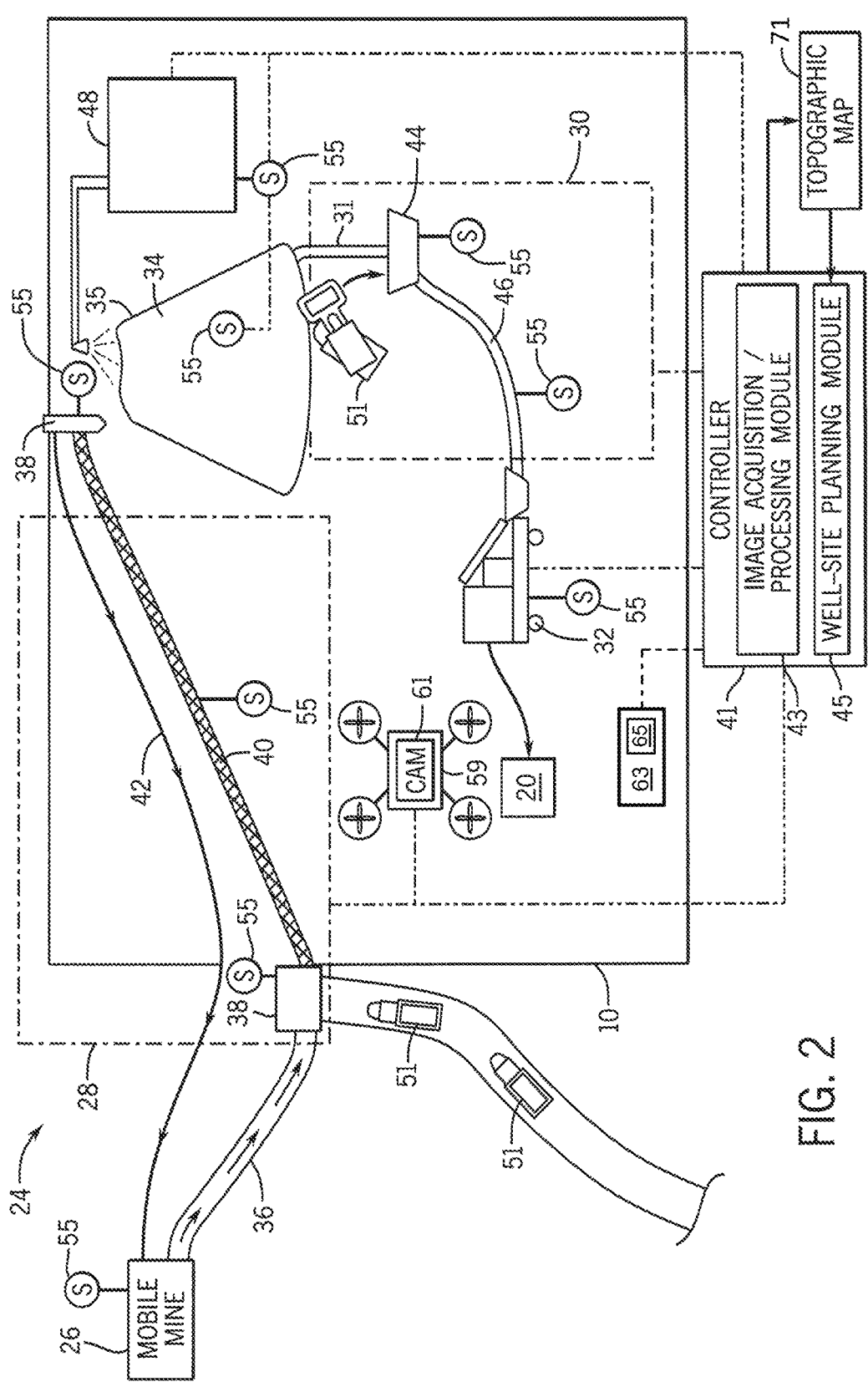
FIG. 2 is a schematic view of an embodiment of sand stockpiling and distribution system for use in well completion operations, in accordance with the present disclosure.

FIG. 2 is a schematic diagram of a sand stockpiling and distribution system 24 having a sand mine 26 (e.g., mobile mine), a stockpile generation system 28, a metering system 30, and a fracturing fluid blender 32. Each of the systems may work collectively to retrieve sand from the sand mine 26 and deliver sand for use in well completion operations at the well-site 10. For example, the sand mine 26 may include sand that may be mixed with water and/or one or more chemicals to produce a sand slurry that may be directed to a sand stockpile 34 via the stockpile generation system 28. In turn, sand from the sand stockpile 34 may be directed towards the fracturing fluid blender 32 via the metering system 30 to be mixed with water and/or one or more chemicals to produce a fracturing slurry that may be directed down into the well 20 to create fractures in the subterranean formation 14.

The sand mine 26 may be associated with one or more sand deposits having a threshold amount of sand (e.g., 5 tons, 10 tons, 20 tons) that may be retrieved and utilized for well completion operations. Additionally, the sand mine 26 may have a location that is within a threshold distance (e.g., 0.5 mile, 1 mile, 5 miles, 10 miles) of the well-site 10, such that one or more pipelines may be utilized to deliver sand from the sand mine 26 to the stockpile generation system 28. However, in some embodiments, the sand mine 26 may have a location that is outside of the threshold distance, and one or more vehicles may be utilized to transport sand from the sand mine 26 to the stockpile generation system 28, as described in greater detail below. Additionally, in some embodiments, the sand stockpiling and distribution system 24 may include multiple sand mines 26 to provide a sufficient amount of sand to generate a stockpile of sand at or near the well-site 10. For purposes of this disclosure, a sufficient amount of sand as referred to herein may correspond to an amount of sand needed to complete a desired well operation (e.g., a well fracturing operation for one or more wells 20) at the well-site 10 and/or an amount of sand needed to perform the desired well operation continually without experiencing downtime, delays or interruptions due to sand logistics (e.g., retrieval, transportation, and delivery of sand).

The stockpile generation system 28 may be located at or near (e.g., within 250 feet, 500 feet, 1000 feet) the well-site 10 and may be configured to receive, process, and direct sand (e.g., sand slurry, dry sand, damp sand) from the sand mine(s) 26 to the sand stockpile 34. Accordingly, the stockpile generation system 28 may include a sand slurry pipeline 36, one or more sand processing devices 38, a conveyor belt 40, and a water return pipeline 42. The sand slurry pipeline 36 may extend from the sand mine(s) 26 to the stockpile generation system 28 and may include one or more pipelines (e.g., conduits, pipes) configured to direct a sand and water mixture (e.g., sand slurry) from the sand mine(s) 26 to a location at or near the well-site 10 to be processed by the stockpile generation system 28. For example, upon reaching the stockpile generation system 28, the sand slurry may be directed through the sand processing device(s) 38 (e.g., cyclone separators, screw press, vibrating screen, shaker, and the like) prior to placement on the sand stockpile 34. The sand processing device(s) 38 may be configured to remove a threshold amount of water (e.g., 70%, 80%, 90%) from the sand slurry before delivering the sand to the sand stockpile 34. As such, in some embodiments, the sand delivered to the sand stockpile 34 may be damp sand having a threshold amount of humidity (e.g., threshold amount of moisture, threshold degree of moisture, 5%, 10% moisture content) based on the environmental conditions (e.g., wind, precipitation, temperature) at the sand stockpile 34. Further, in some embodiments, the sand processing device(s) 38 may filter out or separate other unwanted particles (e.g., rocks, debris, or particulate greater than a threshold size) from the sand slurry mixture delivered via the sand slurry pipeline 36 before delivering the sand to the sand stockpile 34. As discussed herein, the terms "threshold degree of moisture," "threshold amount of moisture," "threshold degree of humidity," and "threshold amount of humidity," may be used interchangeably and may refer to a desired range of moisture of sand in the sand stockpile. For example, the desired range of moisture in the sand may include a lower threshold moisture content (e.g., 2%, 5%) that limits an amount of sand lost from environmental conditions (e.g., increase weight of sand such that sand does is not carried away by windy conditions) and a higher threshold moisture content (e.g., 7%, 10%) that limits an amount of bacterial growth in the sand stockpile.

The conveyor belt 40 may be coupled to the sand slurry pipeline 36 and/or the sand processing device(s) 38 and may be configured to direct sand (e.g., sand slurry, damp sand, dry sand) towards an apex 35 (e.g., upper point of the sand stockpile 34 relative to gravity) of the sand stockpile 34. The conveyor belt 40 may be driven by an electric motor or combustion engine, which in turn is controlled by a controller (e.g., a processor-based controller). The conveyor belt 40 also may be coupled to a support structure, such as an angled arm, a crane, a lattice boom, scaffolding, or another angled structure extending from a base to an elevated location above the apex 35 of the sand stockpile 34. For example, in some embodiments, the conveyor belt 40 may be coupled to the sand slurry pipeline 36 and the sand processing device 38 may be positioned downstream of the conveyor belt 40 relative to a flow direction of sand towards the sand stockpile 34. In some embodiments, the sand processing device 38 may be coupled to the sand slurry pipeline 36 at a position upstream of the conveyor belt 40 relative to the flow direction of sand towards the sand stockpile 34, and the conveyor belt 40 may be coupled to the sand processing device 38. Still in some embodiments, the stockpile generation system 28 may include a sand processing device 38 positioned both upstream and downstream of the conveyor belt 40, and thus the conveyor belt 40 may be coupled to sand processing devices 38 at both ends. After removing a desired amount of water (e.g., moisture) from the sand delivered to the sand processing device(s) 38, the water return pipeline 42 may be configured to direct the removed water back to the sand mine(s) 26, thereby enabling the removed water to be reused in transporting sand to the sand stockpile 34.

It should be noted that the stockpile generation system 28 may also include other transporting and/or processing equipment (e.g., vehicles, augers, telestackers, screens, pipes, hoses, and the like) to facilitate delivery of the sand to the sand processing device(s) 38, the conveyor belt 40, and/or the sand stockpile 34. For example, while FIG. 2 illustrates sand being delivered to the stockpile generation system 28 via the sand slurry pipeline 36, in some embodiments, dry or damp sand may be delivered to the conveyor belt 40 via vehicles 51 (e.g., truck, trailer). Further, in some embodiments, additional placing equipment (e.g., crane, front loaders, elevator buckets) may be utilized to place sand on the apex 35 of the sand stockpile 34. Additionally, while the sand stockpile 34 is illustrated as having a pyramid shape, the sand stockpile 34 should not be limited to a pyramid shape and may include other polygonal shapes (e.g., rectangular prism, cylindrical prism, kidney bean shaped). Accordingly, the term apex 35 as used herein may relate to an upper portion (e.g., upper surface) of the sand stockpile 34 relative to gravity.

The metering system 30 may be configured to measure and direct sand from the sand stockpile 34 to the fracturing fluid blender 32 at the well-site 10 (e.g., fracturing site). In some embodiments, the metering system 30 may include a solid separator 44 (e.g., hopper, screen, shaker, vibrator, cyclone) and a metering belt 46. The solid separator 44 may include a drive or agitator, such as an electric motor or combustion engine, which is controlled by a controller (e.g., a processor-based controller). In some embodiments, the sand processing device(s) 38 (e.g., cyclone sand processing device) mentioned above may also be utilized as a solid separator 44. Similarly, the metering belt 46 may be driven by an electric motor or combustion engine, which in turn is controlled by a controller (e.g., a processor-based controller). The controller(s) may receive sensor feedback from one or more sensors and/or user input from one or more user interfaces to facilitate control of the metering system 30. The controller(s) of the metering system 30 may measure and/or regulate an amount of the sand being directed to the well 20, while also coordinating with other equipment such as the sand mines 26, the sand processing devices 38, the conveyor belt 40, and a sand stockpile treatment system 47.

The solid separator 44 and the metering belt 46 may be controlled by the controller(s) to provide the desired flow and composition of sand to the fracturing fluid blender 32. The solid separator 44 may be configured to remove rocks and/or other solids (e.g., greater than a particular threshold size) from the sand retrieved from the sand stockpile 34 before the sand is delivered to the fracturing fluid blender 32, thereby reducing wear and degradation on the fracturing fluid blender 32. After removing rocks and/or other solids from the sand in the sand stockpile 34 via the solid separator 44, the metering system 30 may deliver the sand to the fracturing fluid blender 32 via the metering belt 46 such that the sand may be mixed with water and/or one or more chemicals to produce a fracturing slurry. In some embodiments, the metering system 30 may further include various equipment to facilitate transportation of sand from the stockpile 34 to the solid separator 44 and/or fracturing fluid blender 32. For example, in some embodiments, a pipeline 31 may be utilized to direct sand from the sand stockpile 34 to the solid separator 44. In other embodiments, conveyor belts, augers, vehicles 51 (e.g., front loaders, cranes, elevator buckets, shovel trucks) and/or other operating equipment may be used to deliver sand from the sand stockpile 34 to the solid separator 44 and/or the fracturing fluid blender 32. Upon reaching the fracturing fluid blender 32, the sand from the stockpile 34 may be mixed with water and/or one or more chemicals to produce a fracturing slurry, and the fracturing slurry may then be directed into the well 20 to create fractures in the subterranean formation 14, thereby increasing oil and gas production from the well 20. The fracturing fluid blender 32 may include a blending tank having a sand inlet, a water inlet, a chemical inlet, a slurry outlet, and one or more internal agitators. The agitators may include rotary impellers or mixers driven by a drive, such as an electric motor or combustion engine. In some embodiments, the solid separator 44 and/or an additional solid separator 44 may be positioned downstream of the fracturing fluid blender 32 to further process the fracturing slurry produced by the fracturing fluid blender 32, thereby further removing debris, solids, and unwanted particles from the fracturing slurry.

In some embodiments, the sand stockpile 34 located at or near the well-site 10 may be exposed to the ambient environment. By exposing the sand stockpile to the ambient environment without utilizing traditional storage equipment, costs associated with storing sand may be decreased. That is, the sand in the sand stockpile 34 may not be contained in traditional storage devices, and thus may be subjected to various environmental conditions (e.g., temperature, precipitation, wind). Accordingly, the sand stockpiling and distribution system 24 may also include a sand stockpile treatment system 47. The sand stockpile treatment system 47 may be configured to maintain one or more properties of the sand in the sand stockpile 34. For example, because the sand stockpile 34 may be exposed to the environment, to limit an amount of sand from being blown away due to environmental conditions (e.g., wind), the sand stockpile treatment system 47 may include a sprinkler system (e.g., plurality of spray nozzles) configured to maintain a threshold amount of humidity in the sand stockpile 34. As measurements are taken (e.g., via one or more sensors, via an operator) to determine the moisture content or humidity level of the sand in the sand stockpile 34, the sprinkler system may be activated based upon a measured humidity level of sand in the sand stockpile 38 falling below the threshold humidity level value. Further, in some embodiments, the sprinkler system may be activated preemptively based on expected environmental conditions. For example, a weather report may be indicative of windy conditions in the near future, and an operator may activate the sprinkler system to increase the humidity or moisture content of the sand in the sand stockpile 34 prior to the windy conditions occurring, thereby limiting an amount of sand lost due to the windy conditions. In some embodiments, the sprinkler system may also be utilized to apply one or more chemicals to the sand stockpile 34, thereby limiting bacterial growth and contamination of sand in the sand stockpile 34. For example, after a period of precipitation, a humidity level of the sand in the sand stockpile 34 may be above a desired threshold value (e.g., greater than 5%, greater than 10%, greater than 15%), which may be associated with increased bacterial growth. As such, the sprinkler system may be activated to apply one or more chemicals to the sand stockpile 34.

The sand stockpile treatment system 47 may include one or more fluid storage containers or supplies (e.g., water supply, chemical supply, etc.), one or more pumps configured to pump the water and chemicals to the sprinkler system, one or more valves configured to regulate flow of the water and chemicals to the sprinkler system, one or more sensors configured to monitor moisture content and/or bacterial growth in the sand stockpile 34, and a controller (e.g., processor-based controller) configured to operate the sand stockpile treatment system 47 to maintain desired conditions (e.g., moisture content, chemical content, bacterial levels, etc.) based on sensor feedback and/or user input, as described in greater detail below. In certain embodiments, the sand stockpile treatment system 47 may periodically (e.g., hourly, daily, weekly, etc.) operate to add moisture and/or chemicals to the sand stockpile 34 to maintain desired conditions of the sand stockpile 34.

As noted above, in some embodiments, the sand stockpiling and distribution system 24 may include a controller 41 coupled to a plurality of sensors 55 and various components of the sand stockpiling distribution system 24 (e.g., stockpile generation system 28, metering system 30, fracturing fluid blender 32, sand stockpile treatment system 47, etc.). For example, the sensors 55, designated as "S," may be positioned at various locations around the sand stockpiling and distribution system 24 and/or coupled to various components of the sand stockpiling and distribution system 24. Each of the sensors 55 may be configured to measure one or more parameters associated with the sand stockpiling and distribution system 24 and send sensor data to the controller 41 to facilitate operation of the sand stockpiling and distribution system 24 (e.g., maintain desired conditions of the sand, control equipment to mobilize the sand), as described in greater detail below.

The sensors 55 may include physical sensors and/or virtual sensors, which are configured to measure certain parameters based on input data. Accordingly, certain parameters may be measured directly via physical sensors and/or indirectly via virtual sensors. The sensors may include any type of device capable of measuring location, pressure, moisture, humidity, temperature, movement, bacterial content, and the like. Thus, the monitored parameters may include a temperature, moisture content, humidity content, a bacterial content, a flow rate, a composition, and/or a pressure of sand (e.g., dry sand, damp sand, sand slurry) at a particular location within the sand stockpiling and distribution system 24. Additionally, the sensors 55 may include environmental sensors, such as wind sensors, temperature sensors, and precipitation sensors to facilitate control of the sand stockpiling and distribution system 24 and maintain desired conditions of the sand as the sand travels from the sand mines 26 to the well(s) 20.

In some embodiments, the sand stockpiling and distribution system 24 may be associated with one or more image capturing devices (e.g., standalone cameras and/or cameras disposed on mobile phone, portable electronic devices unmanned aerial vehicles or drones, manned aerial vehicles such as helicopters, satellite imaging, LIDAR system 63, etc.). The cameras may include still cameras and/or video cameras, which are configured to obtain analog and/or digital images of the well-site 10. For example, one or more drones 59 (e.g., unmanned aerial vehicles having one or more cameras) may be associated with one or more cameras 61 and the drone(s) 59 may be configured to fly over a well-site 10 to acquire image data of the well-site 10 and/or the sand stockpile 34. The camera(s) 61 and/or drone(s) 59 may be communicatively coupled to the controller 41 and may be configured to send image data to the controller 41 for processing, as discussed in greater detail below. In some embodiments, the sand stockpiling and distribution system 24 may also be associated with one or more laser imaging, detection, and ranging (LIDAR) systems 63. The LIDAR system 63 may include one or more lasers 65 that are configured to target an object or surface and measure an amount of time for the reflected light to return to a receiver of the LIDAR system 63. In turn, the image data captured by the LIDAR system 63 may be communicated to the controller 41, thereby enabling the controller 41 to process the image data from the LIDAR system 63. For example, based on an amount of time for reflected light to return to a receiver after being directed towards an object or surface, the controller 41 may generate three-dimensional representations (e.g., image data) of the well-site 10 and/or objects on the well-site 10 (e.g., sand stockpile 34), which in turn, may be utilized by the controller 41, as described in greater detail below. In some embodiments, the LIDAR system 63 may be associated with the one or more drones 59 and thus may acquire laser image data aerially, while in other embodiments, the LIDAR system 63 may acquire the image data from the surface of the well site-10. Additionally, the LIDAR system 63 may utilize ultraviolet (UV) light, visible light, or near infrared light to image objects and/or surfaces.

The controller 41 may include one or more processors, a memory, instructions stored on the memory and executable by the processor, and communication circuitry configured to communicate with the sensors 55 and/or the various components and equipment of the sand stockpiling and distribution system 24. The controller 41 may communicate with the sensors 55 and/or the components and equipment of the sand stockpiling and distribution system 24 via the communication circuitry over any suitable wired or wireless (e.g., radio or light based) network that may facilitate communication of data between systems, devices, and/or equipment. In some embodiments, the network may be a Wi-Fi network, a light detection and ranging (LIDAR) network, a 4G network, a 4G LTE network, a 5G network, a Bluetooth network, a Near Field Communication (NFC) network, or any suitable network for communicating information between devices. In some embodiments, the controller 41 may be configured to communicate with a portable computing device, which may be a portable handheld device used by an operator to facilitate monitoring of the sand stockpiling and distribution system 24. For example, the controller 41 and/or the portable computing device may be configured to receive sensor feedback from the sensors 55, identify changes in monitored parameters, identify when thresholds are crossed for the parameters, and generate outputs to trigger changes in operation of the sand stockpiling and distribution system 24. The controller 41 and/or the portable computing device may use local and/or remote computer systems and storage, web-based interfaces, cloud-based interface, apps on smart devices (e.g., smart phones, tablet computers, etc.), or any suitable user interface to enable the changes in the sand stockpiling and distribution system 24.

In some embodiments, the controller 41 may also include one or more modules having software configured to process and analyze the images obtained via the drone(s) 59, the camera(s) 61 and/or the LIDAR system 63. For example, the controller 41 may include a data acquisition and processing module 43 and a well-site planning module 45. The data acquisition and processing module 43 may be configured to receive image data from image capturing devices (e.g., the drone(s) 59, camera(s) 61, and/or the LIDAR system 63) and may process the image data to generate a topographic map 71 (e.g., topographic image, topographical data) of the well-site 10. In turn, the well-site planning module 45 may utilize the topographic map 71 to determine a suitable location (e.g., site location) for a sand stockpile, as discussed in greater detail below. In some embodiments, the image data retrieved by the data acquisition and processing module 43 may be utilized to determine an amount of volume of sand in the sand stockpile 34.

It should be noted that while the sand stockpile 34 in FIG. 2 is illustrated as being located on the well-site 10, in some embodiments, the sand stockpile 34 may be located off the well-site or partially on the well-site 10 and partially off the well-site 10. However, regardless of whether the sand stockpile 34 is on site, off-site, or a combination thereof, the sand stockpile 34 may be located within a threshold distance of the well 20 at the well-site 10 such that sand from the sand stockpile 34 may be retrieved and delivered to the fracturing fluid blender 32 in real-time as needed for well completion operations. In this way, downtime associated with delivery and/or transportation of sand to a well 20 at a well-site 10 may be reduced, thereby increasing an efficiency of the well completion and production operations, as described in greater detail below.

Figure 3:
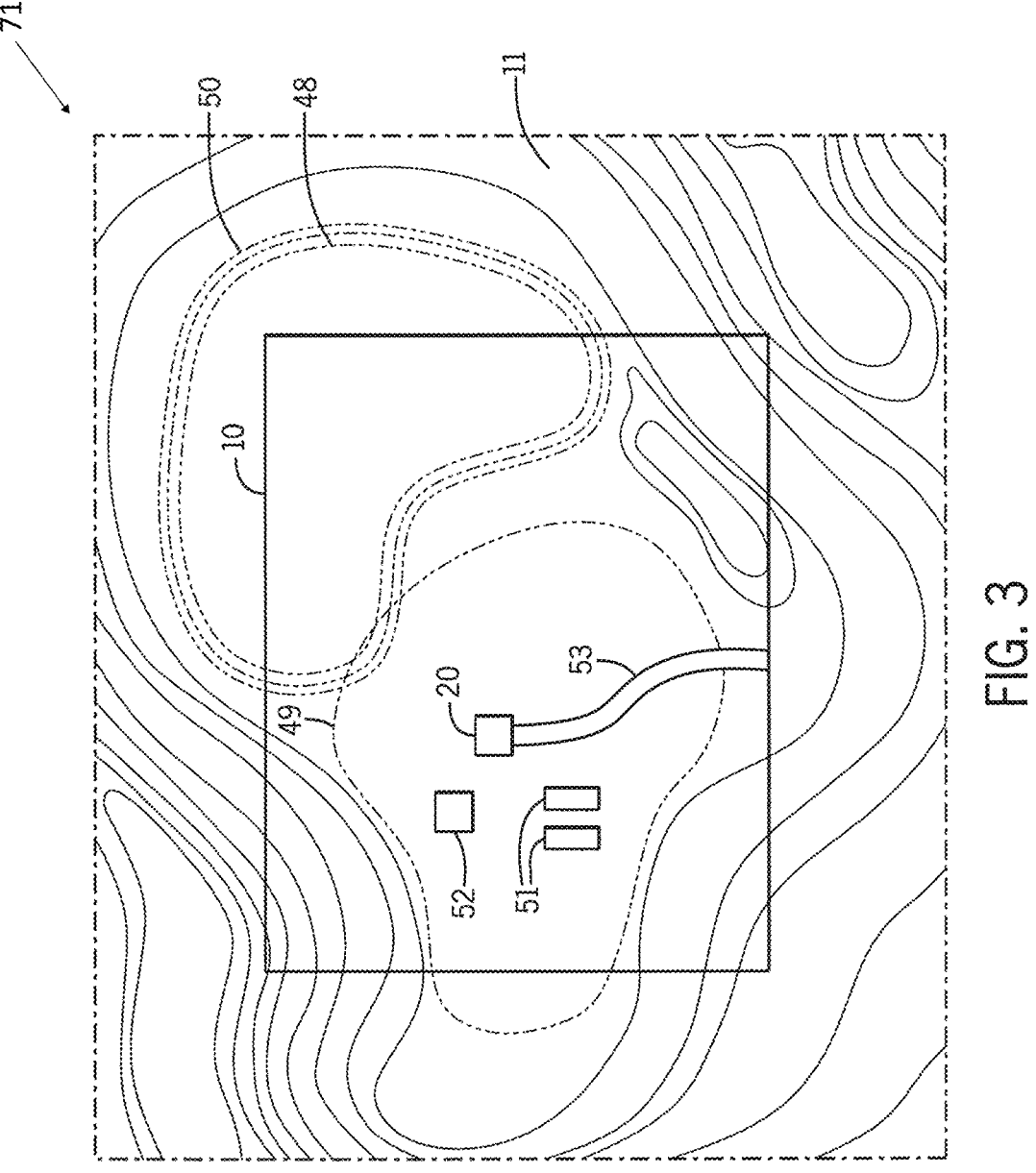
FIG. 3 illustrates an embodiment of a topographical image of a well-site and an area surrounding the well-site illustrating one or more locations to deposit a sand stockpile, in accordance with an aspect of the present disclosure.

FIG. 3 is a topographical map (e.g., topographic map 71) of an embodiment of the well-site 10, which may be utilized to determine a suitable location for a sand stockpile. For example, as discussed above, one or more images (e.g., image data) of a well-site 10 and/or a surrounding area 11 of the well-site 10 may be obtained via one or more image capturing devices (e.g., drones 59, cameras 61, LIDAR system 63). The one or more images of the well-site 10 and/or the surrounding area 11 may be utilized by the drones and/or other image processing systems (e.g., controller 41, software configured to process the image data) to determine a topography (or topographical map) of the well-site 10, which in turn may be utilized to determine a suitable location for a sand stockpile. Similarly, as discussed above, the image data from the LIDAR system 63 may also be utilized to determine a topography of the well-site 10, such that a suitable location for the stockpile may be determined. For example, because the present embodiments are directed towards generating a sand stockpile with a sufficient amount of sand to adequately perform well completion operations, it may be desirable to determine a suitable location for placing a sand stockpile that is within a threshold distance from the well-site 10 and is large enough to accommodate the amount of sand needed, thereby enabling retrieval and delivery of sand for well completion operations on demand in real time.

The suitable location for the sand stockpile may be based on many factors. For example, in some embodiments, the amount of sand to be used for well completion operations may be quantified for a desired well operation (e.g., well fracturing operation), and the suitable location may be determined based on the amount of sand to be used to complete the desired well operation. That is, the suitable location may be selected based on an amount of area available for depositing the sand stockpile such that the amount of area available is large enough to accommodate the determined amount of sand to be used for the desired well operation. Additionally, the suitable location may be determined based on a degree of gradient of the well-site 10 and/or surrounding area 11 and/or an elevation of the land at or near the well-site 10. For example, because large quantities of sand (e.g., 30 tons, 40 tons, 50 tons) may be stockpiled, it may be advantageous to deposit the sand stockpile on a relatively flat surface of the well-site 10 (or near the well-site 10), thereby enabling formation of a solid foundation on which to stockpile the sand. That is, by placing the sand stockpile on a relatively flat portion of the well-site 10 and/or the surrounding area 11 of the well-site 10, an amount of sand lost due to gravity acting on the sand stockpile may be reduced. Additionally, the gradient and elevation of the land may be indicative of a manner in which the land at or near the well-site 10 drains. For example, the topography of the land may indicate that placing a sand stockpile at a particular location would result in drainage (e.g., water runoff) being directed towards the well 20, which may be undesirable. Thus, in some embodiments, the one or more images and/or image data may also be utilized to determine a suitable location to place a drain 48 (e.g., a surface drain or French drain, draining conduits, etc.) for the sand stockpile 34. Further still, the suitable location may be determined based on a proximity to the well-site 10. For example, as noted above, the sand stockpile 34 may be placed on the well-site 10 or within a threshold distance of the well-site 10 such that sand from the sand stockpile 34 may be retrieved on demand for well completion operations. Additionally, the suitable location may be determined based on an amount of interference associated with well completion operations if the sand stockpile 34 were to be placed at a particular location. For example, placing the sand stockpile 34 near areas of ingress and egress may interfere with well completion operations and thus may be undesirable. The suitable location may be based on each of the factors discussed above, and the one or more images from the drone(s) 59 and/or camera(s) 61, as well as the image data from the LIDAR system 63, may be utilized to determine a topography of the well-site 10 and the surrounding area 11 and/or identify activities performed on the well-site 10 such that a suitable location for the sand stockpile 34 may be selected.

As illustrated in FIG. 3, the topography of the well-site 10 (e.g., derived from the one or more images) is indicative of two areas 49 and 50 that correspond to substantially flat surfaces having a desired gradient and/or elevation. However, the first area 49 includes the well 20, along with one or more vehicles 51, other fracking equipment 52 (e.g., derricks, drills), and a road 53, and thus an operator may determine that the first area 49 is an unsuitable location for the sand stockpile. The second area 50 may be generally free of any obstructions, and the size of the second area 50 may be large enough to accommodate an amount of sand to be used for well completion operations. Further, the second area 50 may be within a threshold distance of the well 20 such that sand retrieved from a sand stockpile in the second area 50 may be delivered in real time for well completion operations. The topography of the well-site 10 also indicates a gradual decrease in elevation away from the second area 50, indicating that suitable drainage can be achieved for a sand stockpile 34 disposed in the second area 50. Accordingly, the controller 41 (e.g., via well-site planning module 45) may determine that the second area 50 corresponds to a suitable location for the sand stockpile 34. In some embodiments, the controller 41 may be configured to generate an output indicating one or more suitable locations for the sand stockpile 34, and an operator may provide an input to select one or more of the available options, thereby enabling the controller 41 to control operation of the sand stockpile and distribution system 24 to deliver sand to the selected suitable location.

Figure 4A:
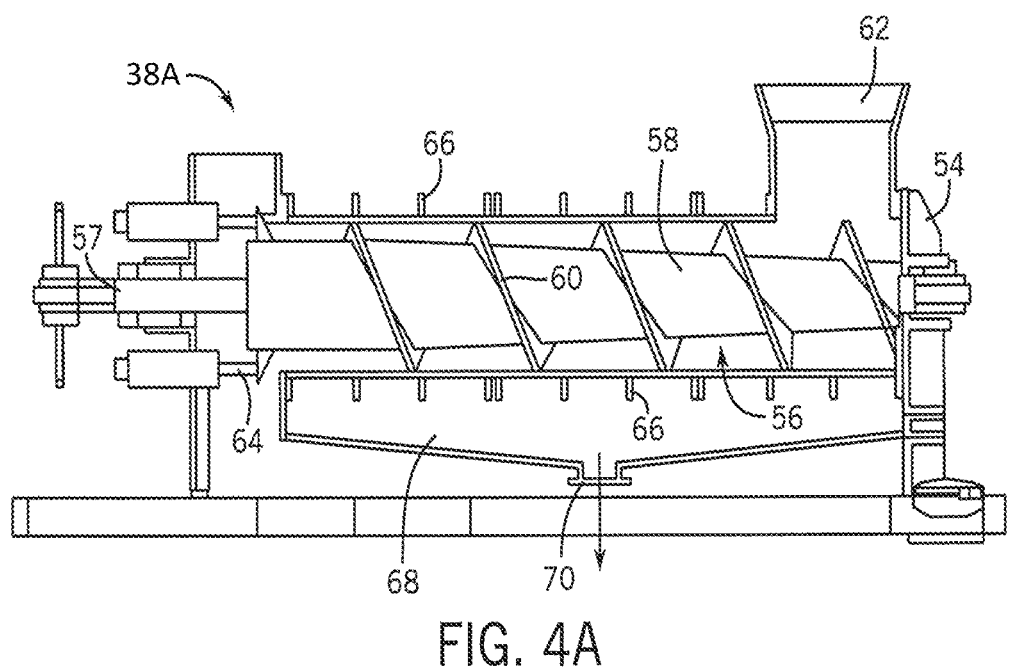
FIG. 4A illustrates an embodiment of a sand processing device of the sand stockpiling and distribution system of FIG. 2, in accordance with an aspect of the present disclosure.
Figure 4B:
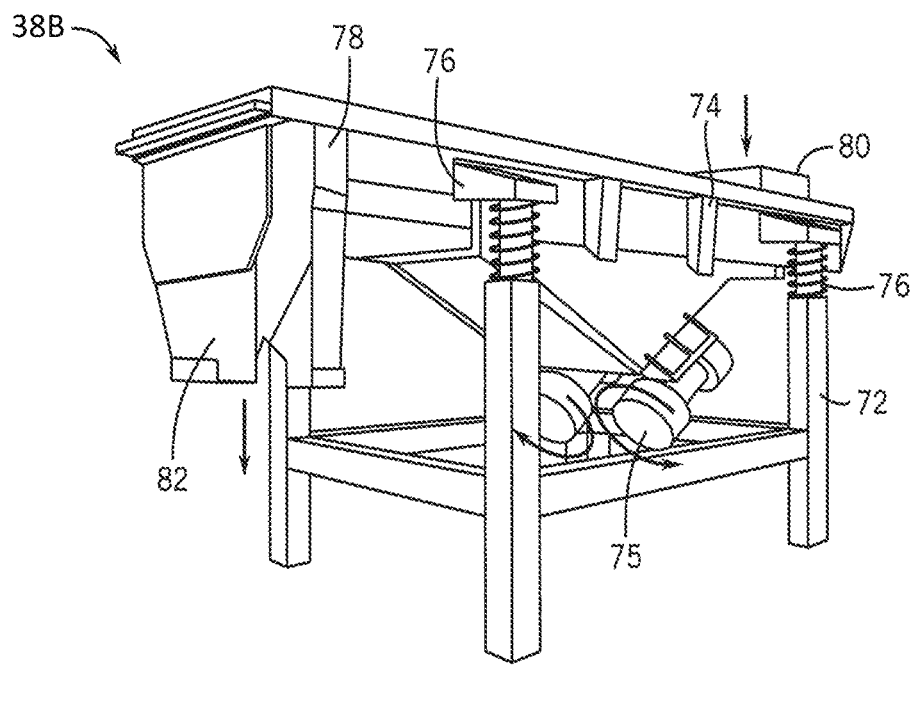
FIG. 4B illustrates an embodiment of a sand processing device of the sand stockpiling and distribution system of FIG. 2, in accordance with an aspect of the present disclosure.
Figure 4C:
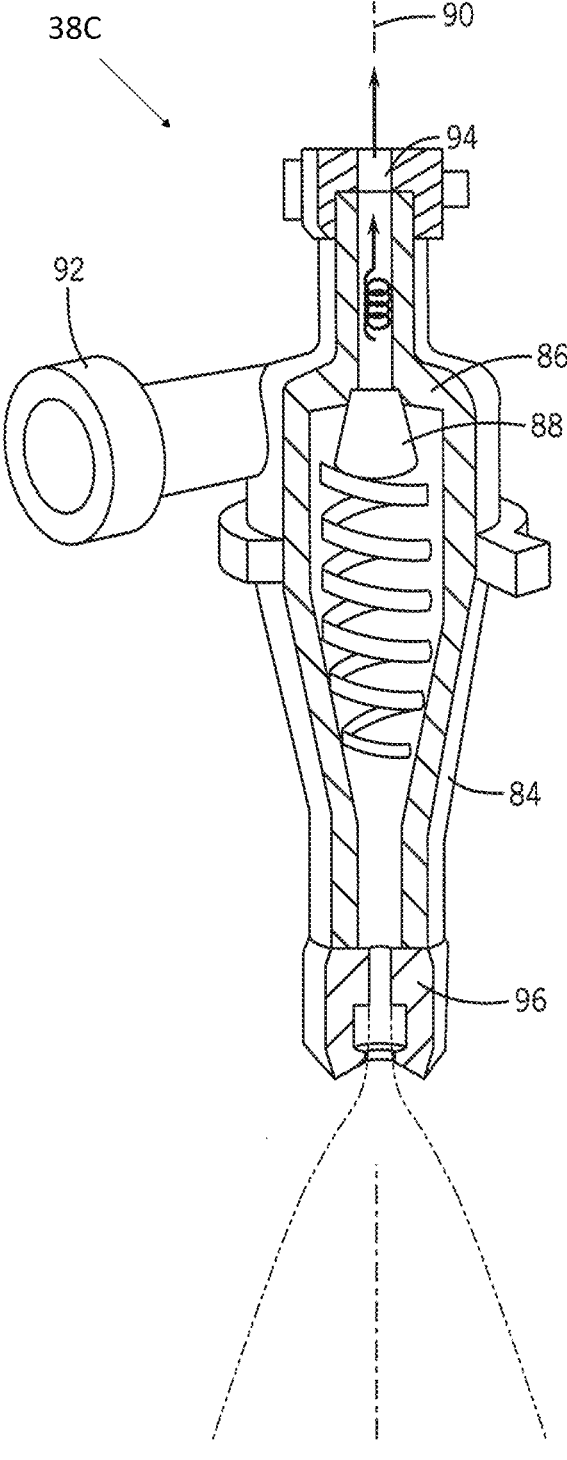
FIG. 4C illustrates an embodiment of a sand processing device of the sand stockpiling and distribution system of FIG. 2, in accordance with an aspect of the present disclosure.

FIGS. 4A-4C illustrate various embodiments of the sand processing device 38 of the sand stockpiling and distribution system 24. For example, as noted above, different sand processing devices 38 may be utilized to separate water from damp sand prior to delivering the damp sand to a sand stockpile 34. FIG. 4A illustrates an embodiment of the sand processing devices 38, including a screw press sand processing device 38A. The screw press sand processing device 38A may be positioned upstream of the conveyor belt 40 relative to a flow direction of sand from the sand mine(s) 26 to the sand stockpile 34.

As illustrated, the screw press sand processing device 38A may include a housing 54 that defines an interior volume 56 of the screw press sand processing device 38A. The interior volume 56 may house a rotor 58 having one or more spiraling threads or fins 60 (e.g., helical threads or fins) configured to direct a sand and water mixture through the housing 54. The rotor 58 may be driven by a drive 57, such as an electric motor or combustion engine, which in turn is controlled by a controller (e.g., controller 41, a processor-based controller). Further, the screw press sand processing device 38A may include an intake port 62 (e.g., tapered vertical opening) fluidly coupled to the interior volume 56, and the intake port 62 may be configured to receive a sand and water mixture and direct the sand and water mixture into the interior volume 56 of the screw press sand processing device 38A. As noted above, in some embodiments, the sand and water mixture (e.g., sand slurry) may be directed from the sand mine 26 into the screw press sand processing device 38A via the sand slurry pipeline 36. That is, the sand slurry pipeline 36 may be fluidly coupled to the intake port 62, thereby enabling the sand slurry to be directed into the screw press sand processing device 38A. In some embodiments, the screw press sand processing device 38A may receive damp sand via vehicles configured to deliver damp sand from the sand mine 26 to the well-site 10. Upon receiving the sand slurry and/or damp sand into the intake port 62, as the rotor 58 rotates, the fins 60 may propel the water and sand mixture through the interior volume 56 and towards an outlet port 64. Additionally, the screw press sand processing device 38A may include a number of screens 66 configured to separate water from the sand as the water and sand mixture is directed through the interior volume 56 of the screw press sand processing device 38A. For example, as the water and sand mixture is directed through the screens 66, water may separate from the sand and flow downward via gravity, and may be collected via a reservoir 68. The reservoir 68 may be fluidly coupled to a drain 70 configured to enable the water removed from the water and sand mixture to drain out of the screw press sand processing device 38A. As water is removed via the drain 70, damp sand having less water relative to the sand and water mixture deposited into the intake port 62 may be directed towards the outlet port 64. The outlet port 64 may be coupled to the conveyor belt 4402, such that damp sand may be directed out of the outlet port 64 and onto the conveyor belt 40 to be directed towards the sand stockpile 34.

FIG. 4B illustrates an embodiment of the sand processing devices 38, including a vibrating screen sand processing device 38B. Similar to the screw press sand processing device 38A discussed above, the vibrating screen sand processing device 38B may be positioned upstream of the conveyor belt 40 relative to a flow direction of sand from the sand mine 26 to the sand stockpile 34.

As illustrated in FIG. 4B, the vibrating screen sand processing device 38B may include a frame 72 configured to support a shaking chamber 74 and a shaker 75 (e.g., vibrator driven by an electric motor or drive). The shaking chamber 74 may be coupled to the frame 72 via one or more elastic members 76 (e.g., springs) which may enable the shaking chamber 74 to move relative to the frame 72 when the shaker 75 is operative. The shaking chamber 74 may also include one or more screens 78 configured to separate water and large particulate (e.g., rocks and debris greater than a threshold size) from a water and sand mixture directed into the shaking chamber 74. For example, the shaking chamber 74 may include various layers (e.g., 2 layers, 3 layers, 4 layers, or more), and each layer may include screens 78 may having different configurations with different sized openings than screens 78 on an adjacent layer. The openings may progressively decrease in size from the top layer to the bottom layer such that larger particulate matter (e.g., rocks, debris greater than a threshold size) may be separated via screens 78 at a higher position relative to gravity, while sand particles having a desired size may be retrieved by screens 78 on a bottom layer of the shaking chamber 74. Meanwhile, water within the sand may pass through each layer of screens 78 and out of the shaking chamber 74. In this way, as the shaker 75 is operated, the shaking chamber 74 may vibrate and/or shake relative to the frame 72, thereby enabling removal of water and/or unwanted particulate matter from a sand and water mixture directed into the shaking chamber 74.

For example, the vibrating screen sand processing device 38B may include an intake port 80 configured to receive a water and sand mixture and direct the water and sand mixture into the shaking chamber 74. In some embodiments, the sand and water mixture (e.g., sand slurry) may be directed from the sand mine 26 into the vibrating screen sand processing device 38B via the sand slurry pipeline 36. That is, in some embodiments, the sand slurry pipeline 36 may be fluidly coupled to the intake port 80, thereby enabling the sand slurry to be directed into the shaking chamber 74. In other embodiments, damp sand delivered via vehicles may be deposited into the intake port 80 and then directed into the shaking chamber to separate water from the water and sand mixture, as described above. As the water and sand mixture passes through the shaking chamber 74, water may separate from the water and sand mixture and may fall via gravity out of the shaking chamber 74 while particulate matter greater than a threshold size may be removed by the screens 78. As the water and/or particulate matter is separated from the sand, damp sand having less water relative to the water and sand mixture received by the intake port 80 may be directed through an outlet port 82 and onto the conveyor belt 40 to be delivered to the sand stockpile 34.

FIG. 4C illustrates an embodiment of the sand processing devices 38, including a cyclone sand processing device 38C. However, unlike the screw press and the vibrating screen sand processing devices discussed above, the cyclone sand processing device 38C may be positioned downstream of the conveyor belt 40 relative to a flow direction of sand from the sand mine 26 to the sand stockpile 34.

As illustrated in FIG. 4C, the cyclone sand processing device 38C may include a housing 84 that defines an interior volume 86 of the cyclone sand processing device 38C. The interior volume 86 may house a vortex generator 88 configured to rotate about a central axis 90 of the cyclone sand processing device 38C. The interior volume may also be fluidly coupled to a pressurized feed inlet 92 configured to direct a water and sand mixture into the interior volume 86 of the cyclone sand processing device 38C. As the vortex generator 88 rotates about the axis 90 (e.g., via a control signal sent from the controller 41), the vortex generator 88 may impart centripetal forces on the water and sand mixture directed into the cyclone sand processing device 38C via the pressurized feed inlet 92. Because water is lighter than the sand in the sand and water mixture directed into the cyclone sand processing device 38C, as the speed of rotation of the vortex generator 88 increases, water particles having a lower weight relative to the sand particles may be directed away from the central axis 90 and upwards relative to gravity towards a water outlet 94. At the same time, as water is removed from the sand and water mixture through the water outlet 94 via rotation of the vortex generator 88, sand may fall via gravity towards an apex nozzle 96. The apex nozzle 96 may be positioned proximate an apex 35 of the sand stockpile 34 such that as sand passes through the apex nozzle 96, the sand may be directed onto the apex 35 of the sand stockpile 34. In some embodiments, the sand and water mixture may be directed into the cyclone sand processing device 38C via the sand slurry pipeline 36. That is, in some embodiments, the sand slurry pipeline 36 may be fluidly coupled to the pressurized inlet feed 92, thereby enabling the sand slurry to be directed into the internal volume 86 of the cyclone sand processing device 38C. In other embodiments, damp sand delivered via vehicles may be deposited onto the conveyor belt 40 and the conveyor belt 40 may be coupled to the pressurized inlet feed 92.

FIG. 5 illustrates a flow chart of a method 100 which may be employed by the controller 41 (or any other suitable computing device) to determine a suitable location for a sand stockpile and to generate and/or manage a sand stockpile for well completion operations. Although the following description of the method 100 is described in a particular order, it should be noted that the method 100 is not limited to the depicted order; and instead, the method 100 may be performed in any suitable order. In addition, although the controller 41 is described as performing the method 100, it should be understood that the method 100 may be performed by any suitable computing device and/or an operator tasked with managing the sand stockpiling and distribution system 24.

Referring now to FIG. 5, the controller 41 at block 102, may determine an amount of sand to be used for well completion operations. The amount of sand to be used for well completion operations may be based on customer and/or operator demands and may be associated with one or more of: a depth of the wells 20, a size, capacity, or expected amount of oil and gas production from the wells 20, historical data associated with fracturing operations, computer models of the wells 20, or any combination thereof. For example, relatively larger wells 20 (e.g., relatively greater expected production of oil and gas) may require larger amounts of sand for well completion operations relative to relatively smaller wells 20. In some embodiments, the amount of sand to be used for well completion operations may be determined using LIDAR technology (e.g., LIDAR system 63). For example, LIDAR technology may be utilized to determine a depth, size, or capacity of a well, which may be indicative of an amount of sand needed for well completion operations.

Upon determining the amount of sand to be used for down well completion operations, the method 100 may proceed to block 104, and the controller 41 may obtain one or more images of the well-site 10 from one or more image capturing devices (e.g., drones 59, cameras 61). As noted above, the one or more images may be captured using drone technology and/or other image capturing devices. For example, an operator may send one or more drones out to acquire images of the well-site 10 and the land within a threshold distance of the well-site 10. In some embodiments, one or more satellite images of the well-site 10 and the surrounding area may be acquired via online databases and the like. Additionally, in some embodiments, images of the well-site may be captured from a digital camera, a mobile phone, or any other device capable of capturing images with a threshold degree of resolution (e.g., threshold number of pixels, greater than 0.5 megapixels) such that the images may be analyzed and processed by the controller 41, as described in greater detail below. In some embodiments, the controller 41 may operate the drone(s) and/or camera(s) 61 until a threshold number of images are taken (e.g., 25 images, 50 images, 100 images). Additionally, as noted above, in some embodiments, the controller 41 may operate the LIDAR system 63 to acquire image data associated with the well-site 10 and/or the surrounding area 11. For example, the one or more lasers 65 of the LIDAR system 63 may target the surface of the well-site 10 and the surrounding area 11 and may record an amount of time for light to return to the LIDAR system 63, which may be sent to the controller 41 for processing.

At block 106, the controller 41 may analyze the one or more images and/or the image data of the well-site 10 and the surrounding area 11 to determine a topography (e.g., topographical map 71) of the well-site 10 and the surrounding area 11. In some embodiments, the drones utilized to capture the one or more images may include one or processors and one or more software modules configured to process the images to determine a topography of the well-site 10 and the surrounding area. The drones and/or controller 41 are configured to generate the topography based on various image analysis techniques, which can identify elevations of objects and land. In certain embodiments, the drones and/or controller 41 may be configured to combine multiple images (e.g., images from drones, satellites, cameras on the ground, etc.) to generate the topographical map of the well-site 10. Similarly, as discussed above, the image data may be indicative of an amount of time taken for light from a laser to reach a target and return to a receiver of the LIDAR system, which may be utilized by the controller 41 to generate a three-dimensional representation of the well-site 10 (e.g., topography) and/or features (e.g., equipment, systems) operating on the well-site 10 and/or the surrounding area 11. The topography of the well-site 10 and the surrounding area 11 may be indicative of a gradient and/or elevation of the land, and may also be indicative of a suitable location for placing a sand stockpile.

After determining the topography of the well-site 10 and the surrounding area, the method may proceed to block 108, and the controller 41 may determine a suitable location for a sand stockpile. The suitable location for the sand stockpile may be based on the amount of sand needed for well completion operations and the topography of the land. For example, as noted above, the suitable location for the land may correspond to an area at or near the well-site 10 that has a sufficient amount of area (e.g., horizontal space or footprint) to accommodate the amount of sand needed for well completion operations. In addition to having a sufficient amount of area to accommodate the amount of sand needed, the suitable location may also include less than a threshold degree of gradient (e.g., less than 5% gradient, 10%) across the surface area of the suitable location and/or may have a gradient that encourages drainage (e.g., water runoff) away from the wells 20 at the well-site 10. Additionally, the elevation of land at and/or near the well-site 10 may be a relevant factor in determining the suitable location for the sand stockpile. For example, a suitable location for the sand stockpile may correspond to an area at the well-site 10 or within a threshold distance of the well-site 10 that is large enough to accommodate the amount of sand needed, reduces an amount of sand lost via gravity, and facilitates drainage from the sand stockpile away from the wells 20 at the well-site 10. It should be noted that the suitable location for the sand stockpile may include an area that is entirely on the well-site 10, entirely off the well-site 10, or partially on the well-site 10 and partially off the well-site 10. Additionally, in some embodiments, multiple suitable locations for a sand stockpile may be determined, and an operator may be tasked with choosing between the suitable locations. Further, different suitable locations may be determined based on a sand type used. For example, different sand types may be placed in different sand stockpiles such that the sand stockpiling and distribution system 24 may retrieve sand from a particular sand stockpile based on the needs of a particular well. In certain embodiments, the computing system (e.g., mobile or stationary computer, processor-based controller, processor-based well-site 10 control system, etc.) may be configured to analyze the topographical map and generate one or more possible site plans, wherein each site plan indicates recommended locations for the sand stockpile 34, the drainage system, and the equipment (e.g., 28, 30, 48, etc.).

Upon determining a suitable location for the sand stockpile, the method 100 may proceed to block 110, and the controller 41 may generate plans to prepare the suitable location for the sand stockpile. For example, in some embodiments, the controller 41 may determine that one or more protective layers (e.g., tarp, cement later, barrier) should be positioned on the suitable location to serve as a barrier between the ground and the sand stockpile, thereby reducing an amount of rocks and debris from mixing with the sand in the sand stockpile. Additionally, the controller 41 may determine that a drain (e.g., drain 48, French drain) should be installed at the suitable location to receive drainage (e.g., water runoff) from the sand stockpile. For example, as noted above, sand delivered to the sand stockpile may contain a threshold amount of water. Additionally, as the sand in the sand stockpile is exposed to the environment, water from precipitation may accumulate in the sand stockpile. Accordingly, as the water drains from the sand stockpile, one or more drains positioned around the sand stockpile may be configured to direct the water away from the well(s) 20 at the well-site 10. Further, in some embodiments, the controller 41 may determine that a barrier or bunker should be installed between two respective suitable locations such that a first type of sand may be stockpiled at the first suitable location and a second type of sand may be stockpiled at the second suitable location. In this way, the barrier or bunker between the two respective suitable locations may limit an amount of mixing between differing sand types. In some embodiments, based on the plans generated by the controller 41, the controller 41 may initiate operation of various equipment associated with the well-site 10 to prepare the suitable location for the sand stockpile. In some embodiments, the controller 41 may send a notification to computing device associated with an operator at the well-site 10, and the notification may include one or more recommended plans to prepare the suitable location for the sand stockpile.

Upon determining that the suitable location is prepared to receive the sand stockpile, the method 100 may proceed to block 112, and the controller 41 may control equipment and/or systems associated with the sand stockpiling and distribution system 24 to generate the sand stockpile at the suitable location. For example, the controller 41 may send a signal to initiate transport of sand from the sand mine 26 to the stockpile generation system 28 (e.g., send signal to open one or more valves in the sand slurry pipeline 36). As sand (e.g., sand slurry, damp sand, wet sand) is received by the stockpile generation system 28, the controller 41 may operate the sand processing device(s) 38 to process the sand received at the stockpile generation system 28. Further, the controller 41 may control a position of the conveyor belt 40 and/or other equipment such that sand may be delivered to the suitable location for the sand stockpile.

At block 114, the controller 41 may periodically (e.g., twice a day, once a day, once a week) receive sensor feedback (e.g., sensor data) from the one or more sensors 55 associated with the sand stockpiling distribution system 24 and/or distributed across the well-site 10. As noted above, the sensor feedback may be indicative of one or more properties of the sand in the sand stockpile and/or one or more environmental conditions at the well-site 10. For example, the sensor feedback may be indicative of a humidity level (e.g., moisture content) of the sand, a temperature of the sand, a bacteria content of the sand, a wind velocity, a temperature of ambient air, a humidity level (e.g., moisture content) of the ambient air, and the like.

Based on the sensor data, at block 116, the controller 41 may control various equipment to treat (e.g., apply water, apply one or more chemicals) the sand in the sand stockpile and/or prepare the sand prior to placing the sand on the sand stockpile. For example, upon determining that a humidity level of the sand is below a desired humidity threshold, the controller 41 may determine to activate a water sprinkler of the sand stockpile treatment system 47, thereby increasing the humidity level of the sand to the desired humidity. Similarly, upon determining that a composition of the sand includes one or more bacteria contaminants, the controller 41 may activate the sand stockpile treatment system 47 to spray one or more chemicals on the sand stockpile, thereby reducing an amount of bacteria in the sand stockpile.

In some embodiments, the controller 41 may determine to activate the sand stockpile treatment system 47 based on environmental conditions exceeding certain thresholds. For example, upon determining that a wind velocity exceeds a specified threshold velocity, the controller 41 may activate the sand stockpile treatment system 47 to spray water on the sand stockpile, thereby limiting an amount of sand carried away from the sand stockpile by the wind. Similarly, in response to determining that a threshold amount of precipitation (e.g., moisture) has accumulated in the sand stockpile, the controller 41 may active the sand stockpile treatment system 47 to spray one or more chemicals on the sand stockpile, thereby reducing an amount of bacteria in the sand stockpile. In some embodiments, at block 116, the controller 41 may generate instructions and/or plans for an operator to implement to treat the sand in the sand stockpile. Further, in some embodiments, an operator may be tasked with periodically retrieving samples of the sand in the sand stockpile to determine the one or more properties, thereby enabling the operator to initiate operations to treat the sand. In some embodiments, an operator may elect to preemptively treat the sand based on expected environmental conditions. For example, upon receiving a weather forecast indicating that wind velocities are expected to exceed certain threshold values at the well-site 10, the operator may activate the sand stockpile treatment system 47 to spray water on the sand stockpile prior to the wind velocity exceeding the threshold value (e.g., 1 hour before, 12 hours before, 1 day before).

In some embodiments, other types of equipment of the sand stockpiling and distribution system 24 may be controlled by the controller 41 based on detected parameters retrieved by the sensors 55 and/or expected conditions. For instance, using the wind velocity example above, the controller 41 may operate the sand processing device(s) 38 for a shorter duration and/or with less intensity such that less water is removed from the sand and water mixture prior to delivering the sand to the sand stockpile. In this way, sand delivered to the sand stockpile may have a greater amount of moisture relative to sand delivered during normal conditions, thereby limiting sand losses from the windy conditions. Conversely, when current conditions and/or expected conditions are indicative of a threshold degree of precipitation, the controller 41 may operate the sand processing device(s) for a longer duration and/or with a greater intensity such that more water is removed from the sand and water mixture prior to delivering the sand to the sand stockpile. In this way, sand delivered to the sand stockpile may have a lesser amount of moisture relative to sand delivered during normal conditions, and current and/or expected precipitation may provide additional moisture such that the sand in the stockpile maintains a threshold degree of moisture (e.g., maintains an expected range of moisture that is high enough to limit sand losses from environmental conditions and/or low enough to limit bacterial growth).

At block 118, the controller 41 may control equipment of the sand stockpiling and distribution system 24 to deliver sand from the sand stockpile to the fracturing fluid blender 32 (e.g., via the metering system 30) to be mixed with water and/or one or more chemicals to generate a fracturing slurry. In turn, the fracturing slurry may be directed down into the wells 20 to facilitate well completion operations. For example, the controller 41 may activate the solid separator 44 to separate unwanted particulate matter from the sand and may control the metering belt 46 to deliver sand to the fracturing fluid blender 32.

As sand is delivered to the fracturing fluid blender 32, at block 120, the controller 41 may obtain one or more images of the sand stockpile and/or image data associated with the sand stockpile. Similar to block 104 discussed above, the one or more images may be acquired via any image capturing device capable of capturing images with a threshold degree of resolution (e.g., drones 59, cameras 61, LIDAR system 63). For example, in some embodiments, the image capturing devices may be drones configured to fly over the sand stockpile and acquire images of the sand stockpile from different angles and perspectives. In some embodiments, the additional images may be images acquired from digital cameras, mobile phones, satellite images, and the like. Similarly, the LIDAR system 63 may be associated with a drone 59 and may capture image of the surface of the sand stockpile aerially. In other embodiments, the LIDAR system 63 may be positioned on the surface and may be configured to measure and or target the sand stockpile to generate a 3D representation of the sand stockpile, as discussed below.

Upon capturing the one or more additional images of the sand stockpile (e.g., via the drone(s) 59, camera(s) 61, LIDAR system 63), the method 100 may proceed to block 122, and the controller 41 may verify an amount of sand (e.g., volume of sand) in the sand stockpile based on the one or more images of the sand stockpile. For example, the one or more images of the sand stockpile may be processed by a software application on the controller 41 to determine a volume of remaining sand in the sand stockpile after a portion of the sand has been used for well completion operations. In some embodiments, the controller 41 may employ three dimensional (3D) modeling and/or estimations based on the one or more images captured at different orientations (e.g., aerial view, side views on multiple sides), and may calculate a volume of sand based on the 3D modeling or estimations. In some embodiments, the drones may acquire video data and/or multiple images in sequence of the perimeter of the sand stockpile, which may facilitate in the modeling or estimations of the geometry of the sand stockpile. In other embodiments, the LIDAR system 63 may target the sand stockpile from various angles and the image data may be utilized by the controller 41 to generate a 3D representation of the sand stockpile. For example, the one or more lasers 65 may draw a virtual pattern of the surface of the sand stockpile to generate the 3D representation. Upon generating a 3D representation of the sand stockpile, the controller 41 may determine a shape and/or size of the sand stockpile and/or verify a volume of sand in the sand stockpile. By verifying an amount of sand in the sand stockpile, the controller 41 may make determinations on whether additional amounts of sand may be needed for the well completion operations. In this way, as an amount of sand in the sand stockpile falls below a threshold value (e.g., less than a ton, less than 5 tons), the controller 41 may control the sand stockpiling and distribution system 24 to obtain additional amounts of sand prior to using all of the sand in the sand stockpile, thereby reducing downtime associated with sand delivery.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
   receiving, via one or more image capturing devices, one or more images associated with a region that is proximate to a well site, within the well site, or both;
   determining a location for a sand stockpile within the region based on the one or more images;
   generating one or more site plans for the sand stockpile based on the determined location;
   delivering sand to the sand stockpile based on the one or more site plans by performing one or more operations using equipment within the region;
   determining that a quantity of the sand in the sand stockpile is below a threshold value, comprising:
     generating a three-dimensional (3D) digital representation of the sand stockpile, comprising one or more of:
       receiving, via one or more image capturing devices, one or more digital images associated with the sand stockpile and generating, via a processor-based controller, the 3D digital representation of the sand stockpile based on the received one or more images; or
       operating one or more lasers to draw a virtual pattern of a surface of the sand stockpile to generate, via the processor-based controller, the 3D digital representation of the sand stockpile; and
     verifying, via the processor-based controller, a volume of the sand in the sand stockpile by analyzing the 3D digital representation of the sand stockpile to determine that the quantity of sand in the sand stockpile is below the threshold value; and
   delivering additional sand from a sand mine to the sand stockpile using additional equipment to cause the quantity of the sand in the sand stockpile to be at least at the threshold value.

2. The method of claim 1, wherein each of the one or more image capturing devices comprises: a laser imaging, detection, and ranging (LIDAR) device, a camera, a drone, a satellite, or a mobile device, or a combination thereof.

3. The method of claim 1, comprising generating a topography associated with the region based on the one or more images.

4. The method of claim 3, wherein the determining the location for the sand stockpile comprises determining the location based on the topography associated with the region.

5. The method of claim 3, further comprising generating the one or more site plans based on the determined location for the sand stockpile and the topography associated with the region.

6. The method of claim 1, further comprising determining a quantity of sand associated with a well operation of a well at the well site.

7. The method of claim 6, wherein the quantity of sand is determined based on one or more factors, comprising: a physical dimension associated with a well at the well site, a capacity associated with the well, a production metric associated with the well, historical data associated with one or more historic well operations, or one or more models associated with the well, or a combination thereof.

8. The method of claim 6, wherein the quantity of sand is determined using one or more laser imaging, detection, and ranging (LIDAR) devices.

9. The method of claim 1, wherein the equipment comprises a metering system configured to deliver the sand to the sand stockpile.

10. The method of claim 9, wherein;
the equipment further comprises a blender;
the metering system is configured to deliver the sand to the blender before the sand is delivered to the sand stockpile; and
the blender is configured to treat the sand based on one or more properties associated with the sand, one or more ambient environmental conditions, or both.

11. The method of claim 1, further comprising:
receiving data from one or more sensors in the region, the data being indicative of one or more properties of sand in the sand stockpile, one or more ambient environmental conditions within the region, or both; and
causing second equipment to perform one or more additional operations to treat the sand based on the one or more properties, the one or more ambient environmental conditions, or both.

12. A method, comprising:
receiving data from one or more sensors in a region that is proximate to a well site, within the well site, or both, the data being indicative of one or more properties of sand in a sand stockpile and one or more ambient environmental conditions of the region affecting the sand, the one or more ambient environmental conditions comprising: a wind velocity, a temperature associated with ambient air, or a humidity level associated with the ambient air, or a combination thereof;
performing one or more operations to treat the sand, using equipment, based on the data from the one or more sensors indicative of the one or more properties and the one or more ambient environmental conditions;
determining that a quantity of the sand in the sand stockpile is below a threshold value, comprising:
generating a three-dimensional (3D) digital representation of the sand stockpile, comprising one or more of:
receiving, via one or more image capturing devices, one or more digital images associated with the sand stockpile and generating, via a processor-based controller, the 3D digital representation of the sand stockpile based on the received one or more images; or
operating one or more lasers to draw a virtual pattern of a surface of the sand stockpile to generate, via the processor-based controller, the 3D digital representation of the sand stockpile; and
verifying, via the processor-based controller, a volume of the sand in the sand stockpile by analyzing the 3D digital representation of the sand stockpile to determine that the quantity of sand in the sand stockpile is below the threshold value; and
delivering additional sand from a sand mine to the sand stockpile using additional equipment to cause the quantity of the sand in the sand stockpile to be at least at the threshold value.

13. The method of claim 12, wherein the one or more operations comprise applying water to the sand, applying one or more chemicals to the sand, removing water from the sand, or a combination thereof.

14. The method of claim 13, wherein the one or more operations treat the sand before the sand is delivered to the sand stockpile.

15. The method of claim 13, wherein the one or more operations treat the sand in the sand stockpile.

16. The method of claim 12, wherein the data indicative of the one or more properties of the sand in the sand stockpile comprises: a humidity level associated with the sand, a temperature associated with the sand, or a bacteria content associated with the sand, or a combination thereof.

17. The method of claim 12, further comprising:
receiving one or more images associated with the region;
determining a location for the sand stockpile within the region based on the one or more images;
generating one or more site plans for the sand stockpile based on the determined location; and
delivering the sand to the sand stockpile based on the one or more site plans by performing one or more operations using second equipment within the region.

18. A method, comprising:
causing first equipment within a region proximate to a well site, within a well site, or both, to generate a fracturing slurry using sand from a sand stockpile;
causing second equipment within the region to initiate delivery of the fracturing slurry to a well associated with the well site;
determining that a quantity of remaining sand in the sand stockpile is below a threshold value, comprising:
generating a three-dimensional (3D) digital representation of the sand stockpile, comprising one or more of:
receiving, via one or more image capturing devices, one or more digital images associated with the sand stockpile and generating, via a processor-based controller, the 3D digital representation of the sand stockpile based on the received one or more images; or
operating one or more lasers to draw a virtual pattern of a surface of the sand stockpile to generate, via the processor-based controller, the 3D digital representation of the sand stockpile; and
verifying, via the processor-based controller, a volume of the remaining sand in the sand stockpile by analyzing the 3D digital representation of the sand stockpile to determine that the quantity of remaining sand is below the threshold value; and
delivering additional sand from a sand mine to the sand stockpile using third equipment to deliver additional sand from a sand mine to the sand stockpile to cause the quantity of the remaining sand in the sand stockpile to be at least at the threshold value.

\* \* \* \* \*